(12) United States Patent
Gottschalk-Gaudig et al.

(10) Patent No.: US 10,899,080 B2
(45) Date of Patent: Jan. 26, 2021

(54) METHOD FOR PRODUCING SHAPED BODIES

(71) Applicant: Wacker Chemie AG, Munich (DE)

(72) Inventors: Torsten Gottschalk-Gaudig, Mehring (DE); Siegfried Dormeier, Stubenberg (DE)

(73) Assignee: WACKER CHEMIE AG, Munich (DE)

( * ) Notice: Subject to any disclaimer, the term of this patent is extended or adjusted under 35 U.S.C. 154(b) by 372 days.

(21) Appl. No.: 15/769,908

(22) PCT Filed: Aug. 26, 2016

(86) PCT No.: PCT/EP2016/070220
§ 371 (c)(1),
(2) Date: Apr. 20, 2018

(87) PCT Pub. No.: WO2018/036640
PCT Pub. Date: Mar. 1, 2018

(65) Prior Publication Data
US 2018/0281294 A1    Oct. 4, 2018

(51) Int. Cl.
*B29C 64/40*    (2017.01)
*B33Y 70/00*    (2020.01)
(Continued)

(52) U.S. Cl.
CPC ............ *B29C 64/40* (2017.08); *B29C 64/112* (2017.08); *B29C 64/35* (2017.08); *B33Y 10/00* (2014.12);
(Continued)

(58) Field of Classification Search
CPC .................................................... B29C 64/40
See application file for complete search history.

(56) References Cited

U.S. PATENT DOCUMENTS 5,686,054 A    11/1997   Barthel et al.
7,368,484 B2    5/2008   Levy
(Continued)

FOREIGN PATENT DOCUMENTS

DE    102013226494 A1    6/2015
EP    0686676 B1    8/1998
(Continued)

OTHER PUBLICATIONS

George W. Sears Jr., Determination of Specific Surface Area of Colloidal Silica by Titration with Sodium Hydroxide, Analytical Chemistry, Dec. 1956, vol. 28, No. 12, pp. 1981-1983, Wilmington, Delaware.
(Continued)

*Primary Examiner* — Larry W Thrower
(74) *Attorney, Agent, or Firm* — Brooks Kushman P.C.

(57) ABSTRACT

A generative process for the manufacture of three-dimensional mouldings is characterized by constructing the moulding stepwise by site-specific delivery of a structure-forming material in liquid form, where a second material is additionally delivered as a supportive material into regions which are intended to remain free from the structure-forming material, and is removed once the structure-forming material has been solidified. The supportive material exhibits low shrinkage upon cooling and is particularly stable in the cooled state and further exhibits low surface roughness.

16 Claims, 4 Drawing Sheets

(51) Int. Cl.
  *B29C 64/112* (2017.01)
  *C08K 3/36* (2006.01)
  *B33Y 10/00* (2015.01)
  *B33Y 40/00* (2020.01)
  *B29C 64/35* (2017.01)
  *C08L 71/02* (2006.01)

(52) U.S. Cl.
  CPC .............. *B33Y 40/00* (2014.12); *B33Y 70/00* (2014.12); *C08K 3/36* (2013.01); *C08L 71/02* (2013.01); *C08L 2205/025* (2013.01)

(56) References Cited

U.S. PATENT DOCUMENTS

| | | |
|---|---|---|
| 2004/0131527 A1 | 7/2004 | Gottschalk-Gaudig et al. |
| 2005/0053798 A1 | 3/2005 | Maekawa et al. |
| 2013/0337277 A1 | 12/2013 | Dikovsky et al. |
| 2015/0028523 A1 | 1/2015 | Jaker et al. |
| 2016/0096298 A1 | 4/2016 | Uchiyama |
| 2016/0312034 A1 | 10/2016 | Schneider et al. |
| 2017/0015063 A1 | 1/2017 | Hanyu et al. |

FOREIGN PATENT DOCUMENTS

| | | |
|---|---|---|
| EP | 1433749 A1 | 6/2004 |
| JP | 2015180537 A | 10/2015 |
| JP | 2016074148 A | 5/2016 |
| JP | 2016074178 A | 5/2016 |
| JP | 2016124159 A | 7/2016 |
| WO | 2014092205 A1 | 6/2014 |

OTHER PUBLICATIONS

Thomas G. Mezger, The Rheology Handbook, For Users of Rotational and Oscillatory Rheometers, 4th Edition, Copyright 2014, Vincentz Network GmbH & Co. KG, 434 pages, Hanover, Germany.

METHOD FOR PRODUCING SHAPED BODIES

CROSS REFERENCE TO RELATED APPLICATIONS

This application is the U.S. National Phase of PCT Appln. No. PCT/EP2016/070220 filed Aug. 26, 2016, the disclosure of which is incorporated in its entirety by reference herein.

BACKGROUND OF THE INVENTION

1. Field of the Invention

The invention relates to a generative process for the manufacturing of three-dimensional mouldings which is characterized in that the moulding is constructed stepwise by site-specific delivery of the structure-forming material in the liquid form, where a second material is additionally delivered as supportive material into regions which are intended to remain free from the structure-forming material, and is removed once the structure-forming material has been solidified.

2. Description of the Related Art

Generative manufacturing processes are available for numerous materials and combinations of these (e.g. metals, plastics, ceramics, glasses).

Various processing methods are available for the manufacturing of mouldings via site-specific delivery of a liquid structure-forming material (sfm).

When an sfm has high viscosity or is a paste it can be delivered and deposited site-specifically in the form of a bead by means of a nozzle. Delivery through the nozzle can be achieved by way of example by using pressure or by using an extruder. A typical example of this processing method is 3D filament printing. Another known method is based on ballistic metering of small quantities of sfm in the form of droplets which are dispensed site-specifically by means of pressure heads. When low-viscosity inks are used that exhibit no or hardly any shear-thinning, the method is termed ink-jet printing, and when higher-viscosity materials are used which exhibit shear-thinning, the term jetting is commonly used.

A precondition for all generative manufacturing methods is the representation of the geometry, and also optionally other properties (colour, material composition), of the desired moulding in the form of a digital 3D-data set which can be regarded as a virtual model of the moulding (A. Gebhardt, Generative Fertigungsverfahren, [Generative Manufacturing Methods] Carl Hanser Verlag, Munich 2013). This modelling is preferably achieved by means of various 3D-CAD methods (computer-aided design). Input data for the generation of a 3D CAD model can also comprise the 3D measurement data resulting by way of example from CT (Computer Tomography) measurements or MRT (Magnet Resonance Tomography) methods. The 3D CAD data set must then be supplemented by material-, process- and plant-specific data, and this is achieved by exporting the data set in a suitable format (such as e.g. STL, CLI/SLC, PLY, VRML, AMP format) by way of an interface to Additive Manufacturing Software. This software finally uses the geometric information to generate virtual individual layers (slices), while taking into account the ideal orientation of the component in the construction chamber, supportive structures, etc. The complete data set can then be used for direct control of the machine (3D-printer) used for the generative manufacturing process.

One software sequence is as follows:
1. Design of the component in CAD format
2. Export into the STL data format
3. Division of the 3D model into layers parallel to the plane of printing and generation of the G-code
4. Export of the G-code to the printer control system.

A feature common to all generative manufacturing methods with site-specific delivery of the sfm is the need for supportive structures in regions of cavities, undercuts and overhangs, because site-specific delivery of sfm always requires a supportive surface prior to hardening of the sfm.

Appropriate supportive materials (sm) for generating supportive structures are known.

US 2015/0028523 A1 describes the use of a thermoplastic polymer based on polyglycolic acid as sm for filament printing. It is disadvantageous here that the thermoplastic sm must be heated to high temperatures of 200° C. and higher, and removal of the sm requires, by way of example, use of aqueous alkaline solution.

US 2013/0337277 A1 describes the use of radiation-crosslinking block copolymers, for example based on acrylated polyethylene glycol-polycaprolactone block copolymers as a temporary sm. The radiation crosslinking in the presence of water produces hydrogels, which can be removed via enzyme decomposition. It was found that formation of the chemical gels via crosslinking is slow and that the enzymatic degradation is time-consuming and that a precondition for the latter is appropriate storage of the lipases used. Hydrogels moreover have the inherent disadvantage that water can evaporate during the construction of the intended structure, and shrinkage of the supportive structure can thus occur.

This problem also occurs with hydrogels based on particulate gel-formers such as phyllosilicates and silicas: experiments with aqueous dispersions of bentonites showed that adequately stable gels can be produced which initially provide suitable supportive structures. However, during the printing process, which can sometimes take some hours, loss of shape can occur as a result of evaporation of water.

U.S. Pat. No. 7,368,484 B2 describes the use of Reverse Thermal Gelation to form supportive structures. This utilises the reversible formation of gel from copolymers exposed to temperature increase. However, the strength of these gels is not adequate, and partial radiation crosslinking is therefore also required, making the subsequent removal of the supportive structures more difficult.

WO 2014/092205 A1 mentions the utilization of polyethylene glycol, in particular PEG 2000, for forming supportive structures. The lower melting point of PEG 2000 relative to the thermoplastic sbM is exploited here. The generative manufacturing method employed here is so-called "laminated object manufacturing" in which entire layers, i.e. laminates, of the sbM are deposited. However it has been found that the exclusive utilization of a PEG, for example PEG 2000, in the site-specific simultaneous delivery of elastomers and supportive material in the form of individual droplets is disadvantageous. Thus the supportive compound exhibits distinct shrinkage after cooling which has a deleterious effect on the shape fidelity of the actual component. Furthermore, the PEG melt has a low dimensional stability so that after the site specific delivery the droplets bleed and the printing of fine structures is accordingly not possible.

Overall it can be stated that no method disclosed in the prior art is suitable for simple production of supportive structures for generative manufacturing methods with site-specific delivery of the sfm, where the supportive structures have a high stability in 3D printing, have low shrinkage and can then in turn be removed without difficulty.

It was therefore an object of the present invention to provide a generative (=additive) process for the production of 3-dimensional mouldings which permits not only site-specific delivery of the structure-forming material (sfm) but also simple and inexpensive site-specific construction of supportive structures made of supportive material (sm) and, in turn, removal of the same. The sm here is intended to develop its supportive properties rapidly, to retain the supportive properties during the process, and then in turn be removed easily, without damage to the moulding or adverse effect on the properties thereof. Moreover, the sm is intended to display low shrinkage on cooling, to be particularly stable at temperatures of below 60° C. and, in addition, to have low surface roughness.

These objects are achieved via the process of the invention.

SUMMARY OF THE INVENTION

The process of the invention is directed to the additive manufacturing of mouldings (8) via site-specific delivery of a structure-forming material (sfm)=(6b), characterized in that simultaneously or at staggered intervals at least one supportive material (sm)=(6a) is delivered into regions which remain free from sfm (6b),
  where the delivery of the sm (6a) is achieved by way of
    a device which has at least one delivery unit (1a) for the sm (6a), where the said unit can be positioned in x-, y- and z-direction with a precision of at least ±100 µm, and thus via the site-specific delivery of the sm (6a) not only in the x, y-operating plane but also in the z-direction successively constructs the supportive structure made of sm (6a) for the moulding (8),
    with the proviso that the sm (6a)
      is a composition having pseudoplastic, viscoelastic properties at 70° C. and comprising
        (A) a polyether composition comprising
          (A1) at least one first polyether having a melting point lower than 35° C. and
          (A2) at least one second polyether having a melting point 35° C. or higher,
            wherein the proportion of the second polyether based on the total weight of the polyether composition is 5% by weight or more to 70% by weight or less, and
        (B) at least one particulate rheological additive,
        (C) optionally other additional substances
      has a shear viscosity of at most 100 Pas (measured at 70° C. with shear rate 100 s$^{-1}$),
      has a storage modulus G' of at least 100 Pa, and
      a solidification temperature of from 20° C. or more up to 60° C. or less,
and once the manufacturing of the moulding (8) has been concluded the sm (6a) is removed from the moulding (8).

DETAILED DESCRIPTION OF THE PREFERRED EMBODIMENTS

Figure 1:
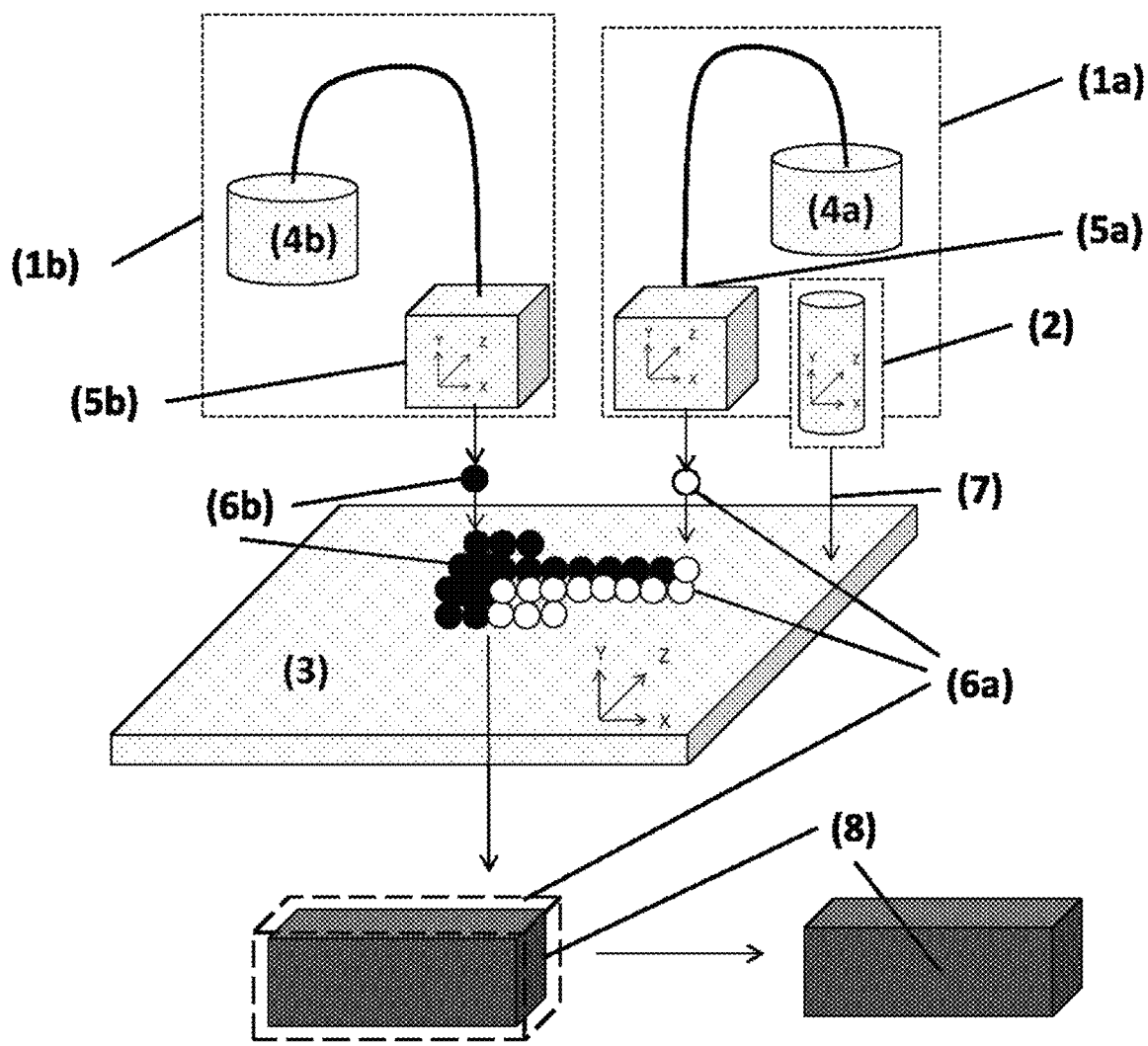
FIG. 1 illustrates one embodiment of an apparatus and process for preparing 3D structures according to the invention.

FIG. 1 is a diagram, of an example showing the construction of a possible generative manufacturing system of the invention which is used to carry out the process of the invention for the production of silicone elastomer parts (8) with supportive structures (6a). The location of the pseudoplastic viscoelastic sm (6a) is in the reservoir (4a) of an individual metering system, (1a) which is subject to pressure and has connection by way of a metering line to a metering nozzle (5a). Upstream or downstream of the reservoir (4a) there can be equipment permitting evacuation to remove dissolved gases. The sfm (6b) is delivered by way of another independently operating individual metering system (1b). (1b) Is likewise equipped with a reservoir (4b), which has connection by way of a metering line to a metering nozzle (5b). Upstream or downstream of the reservoir (4b) there can also be equipment permitting evacuation to remove dissolved gases.

The individual metering nozzles (5a) and (5b) can be accurately positioned independently of one another in the x-, y- and x-direction in order to permit precisely targeted deposition of the sm (6a) and, respectively, the sfm (6b) on the baseplate 3, which is preferably heatable and can likewise be positioned in the x-, y- and z-direction, and during the subsequent progress of formation of the moulding on the previously deposited sm (6a) or previously deposited, optionally previously crosslinked, sfm (6b).

For the crosslinking of the sfm (6b) there can moreover be one or more radiation sources (2) present which can preferably likewise be accurately positioned in the x-, y- and z-direction and incipiently crosslink, or entirely crosslink, the sfm (6b) by means of radiation (7).

It is preferable that process units with high accuracy of repetition are used for the positioning of the metering nozzles (5a) and (5b). The precision of the process unit, used for the positioning of metering nozzles (5a) and (5b) in all three spatial directions is at least ±100 µm, preferably at least ±25 µm. The maximal velocity of the process units used is a decisive factor in determining the production time of the moulding (8) and should therefore be at least 0.1 m/s, preferably at least 0.3 m/s, more preferably at least 0.4 m/s.

Preference is given to metering nozzles (5a) and (5b) which permit jetting of medium- to high-viscosity liquids. Those that can be used are in particular (thermal) bubble-jet heads and piezo printing heads, particular preference being given here to piezo printing heads. The latter permit jetting not only of low-viscosity materials, where droplet volumes of a few picolitres (where 2 pL corresponds to a dot diameter of about 0.035 µm) can be achieved, but also of medium- and high-viscosity materials such as the sm (6a), where preference is given to piezo printing heads with nozzle diameter from 50 to 500 µm, and where droplet volumes in the nanolitre range (from 1 to 100 nL) can be produced. With low-viscosity compositions (<100 mPas) these printing heads can deposit droplets at very high metering frequency (about 1-30 kHz), while with higher-viscosity compositions (>100 mPas) metering frequencies up to about 500 Hz can be achieved, depending on rheology properties (shear-thinning behaviour).

The chronological sequence of the construction of supportive structures (6a) and targeted structures (6b) depends greatly on the desired geometry of the moulding (8): it can be more useful or indeed essential to begin by constructing at least parts of the supportive structures (6a), and then to generate the actual targeted structure (6b). However, it can also be possible to generate both structures in parallel, i.e. without chronological separation, i.e. by means of parallel metering from two independent sets of metering equipment. An approach that is sometimes more useful comprises firstly the construction of at least parts of the targeted structure (6b), followed by construction of at least parts of supportive structures (6a). In the case of a component with complex geometry it is sometimes necessary to use all of the possible variants.

When liquid, uncrosslinked sfm (6b) is delivered, examples being acrylic resins and silicone rubber compositions, it is necessary to crosslink these to form stable targeted structures (8). It is preferable that the sfm (6b) deposited droplet by droplet is crosslinked by means of one or more sources (2) of electromagnetic radiation (e.g. IR laser, IR radiant source, UV/VIS laser, UV lamp, LED), which preferably likewise are displaceable in the x-, y- and z-directions. The radiation sources (2) can have deflection mirrors, focusing units, beam-expansion systems, scanners, diaphragms, etc. Deposition and crosslinking must be balanced with one another. The process of the invention comprises all relevant conceivable possibilities. By way of example, it can be necessary to begin by covering an area of the x-, y-operating plane with droplets of the sfm (6b) and to wait until levelling (coalescence) occurs before then irradiating and crosslinking this area. Equally it can be useful for shaping purposes to begin by solidifying the applied area only in the periphery region, and then to use suitable shading patterns for incipient crosslinking of the internal region. It can also be necessary to bring about crosslinking, or incipient crosslinking, of individual droplets immediately after deposition thereof in order to prevent undesired flow. It can be advantageous to irradiate the entire operating region continuously during formation of the moulding, in order to achieve complete crosslinking, or to expose the same only briefly to the radiation in order to bring about controlled incomplete crosslinking (green strength); this can sometimes be accompanied by better adhesion of the individual layers to one another. It will therefore generally be necessary that the parameters determining deposition and crosslinking are balanced with one another in a manner depending on the crosslinking system, rheological behaviour, and the adhesive properties of the sfm (6b), and also optionally of the other materials used.

It is preferable that sfm (6b) used comprises liquid acrylates, acrylate-silicone copolymers or physical mixtures of these, acrylic-functional silicones or pure silicone rubber compositions. Preference is given to the use of acrylate-silicone copolymers or physical mixtures of these, acrylic-functional silicones or pure silicone rubber compositions, particularly acrylic-functional silicones or pure silicone rubber compositions, and in one specific embodiment silicone rubber compositions, in particular radiation-crosslinking silicone rubber compositions.

In order to avoid or eliminate contamination of the metering nozzles, the system shown in FIG. 1 can be supplemented by an automatic metering nozzle cleaning unit.

The individual metering systems can have a temperature control unit in order to condition the rheological behaviour of the materials and/or to utilize the viscosity reduction due to elevated temperatures for the jetting procedure.

It is preferable when at least for the sm employed according to the invention (6a) the individual metering system (1b), the reservoir (4b) and optionally the metering line are provided with temperature control units.

The individual metering system (1a) can optionally also deliver the sm. (6a) in the form, of a thin bead, by the dispensing process. This process has advantages in particular for relatively large, flat structures, e.g. with respect to printing speed.

The process of the invention for the production of supportive structures (6a) can be combined with any of the known processes for the additive manufacturing of structures where the structure-forming material (sfm)=(6b) is delivered site-specifically in liquid form, among these are filament printing, dispensing, ink-jet processes and jetting. Preference is given to dispensing and jetting of medium- to high-viscosity, shear-thinning liquid sfm (6b); particular preference is given to the dispensing and jetting of addition-crosslinking silicone elastomers and, in one specific embodiment, the jetting of UV-activated or radiation-crosslinking silicone elastomers.

The entire apparatus ("plant") shown by way of example in the diagram of FIG. 1 can also be accommodated in a vacuum chamber or inert-gas chamber, for example in order to exclude UV-C radiation losses due to oxygen or to avoid air inclusions in the moulding.

The printing chamber of the plant, or the entire plant, can be accommodated in a chamber in order to exclude atmospheric moisture; this chamber can be flushed with dry air from the outside, or the air in the chamber can be dried by pumped circulation through a drying unit, for example a drying cartridge using molecular sieve, or a condensing unit.

The pseudoplastic, viscoelastic sm (6a) used in the process of the invention is preferably composed of the following components:
(A) polyether composition comprising
  (A1) at least one first polyether having a melting point of lower than 35° C. and
  (A2) at least one second polyether having a melting point of 35° C. or higher,
  wherein the proportion of the second polyether (A2) based on the total weight of the polyether composition (A) is 5% by weight or more to 70% by weight or less,
(B) particulate rheology additive, and
(C) optionally other additional substances.
Component (A)
  Component A comprises:
  (A1) at least one first polyether having a melting point of less than 35° C., preferably 30° C. or less, more preferably 25° C. or less, and in particular 10° C. or less, and
  (A2) at least one second polyether having a melting point of 35° C. or more, preferably 40° C. or more, more preferably 45° C. or more, yet more preferably 50° C. or more, and most preferably 55° C. or more.

The polyethers employed are typically commercial products marketed for example by Clariant under the trade name Polyglykol. If polyethers solidify in a particular temperature range (solidification range) the melting point of a polyether is to be understood as meaning the lower limit of the solidification range. Irrespective thereof the melting points/solidification ranges of the polyethers may be determined for example by DSC according to DIN EN ISO 11357-3. Here, the melting point/solidification range is determined by differential scanning calorimetry (DSC): Instrument DSC 1 from Mettler-Toledo, Module type: DSC1/500 (module name: DSC1_1448)): sample weight: 8.5 mg, temperature range −70° C. to 150° C., heating/cooling rate 10 K/min; two runs were measured (one run consists of the following heating and cooling cycle: from −70° C. (10 K/min) to 150° C. and from 150° C. (10 K/min) to −70° C.); the second run was used for the evaluation.

The proportion of the second polyether (A2) based on the total weight of the polyether composition (A) is 5% by weight or more to 70% by weight or less, preferably 10% by weight or more to 65% by weight or less, and more preferably 15% by weight or more to 60% by weight or less.

If the proportion of the second polyether (A2) is too low, the sm has a low stability in the cooled state. If the proportion of the second polyether (A2) is too high, a more severe shrinkage is observed upon cooling of the sm.

The proportion, of the first polyether (A1) based on the total weight of the polyether composition (A) is preferably 30% by weight or more to 95% by weight or less, more preferably 35% by weight or more to 90% by weight or less, and most preferably 40% by weight or more to 85% by weight or less.

It is preferable in the polyether composition (A), for the first polyether (A1) and the second, polyether (A2), independently of one another, to be polyalkylene glycols of the general formula (I)

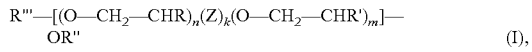

$$R'''{-}[(O{-}CH_2{-}CHR)_n(Z)_k(O{-}CH_2{-}CHR')_m]{-}OR'' \quad (I),$$

where
R is hydrogen or a $C_1$-$C_4$-hydrocarbon moiety, preferably hydrogen or methyl moiety, and
R' is defined in the same way as R, where the moieties R and R' can be identical or different, and
R" is hydrogen, an optionally substituted, mono- or polyunsaturated $C_1$-$C_{20}$-hydrocarbon moiety, aryl moiety, acyl moiety —(O)C—$R^x$ such as formyl, acetyl, benzoyl, acrylic, methacrylic, vinyl moiety, glycidoxy moiety, polyalkylene glycol moiety such as polyethylene glycol moiety or polypropylene glycol moiety having from 1 to 50 repeating units, preferably hydrogen or methyl, and most preferably hydrogen and
R''' is defined in the same way as R", where the moieties R" and R''' can be identical or different, and
$R^x$ is hydrogen, an optionally substituted, mono- or polyunsaturated $C_1$-$C_{20}$-hydrocarbon moiety or aryl moiety, and
Z is a monomer having more than 2 hydroxy groups per molecule, i.e. a branching point, for example trihydric alcohols such as propanetriol or tetrahydric alcohols such as 2,2-bis(hydroxymethyl)-1,3-propanediol, where the hydroxy groups in the polyalkylene glycols are etherified with the alkylene glycol monomers and thus give branched polyalkylene glycols preferably having 3 or 4 side chains, and
k is 0 or 1, and
n, m are an integer from 0 or more, with the proviso that n+m is greater than or equal to 1.

It is preferable that the polyalkylene glycols are linear, or branched, having 3 or 4 side chains per molecule.

In a further embodiment the polyether composition (A) may employ for the first polyether (A1) and the second polyether (A2), independently of one another, monoethers of the above-defined polyalkylene glycols, preferably polyethylene glycol monoethers, polypropylene glycol monoethers or ethylene glycol-propylene glycol copolymer monoethers, preferably with an alkyl ether radical, more preferably a $C_1$-$C_{10}$-alkyl ether radical, such as methyl ether, ethyl ether, n-propyl ether, n-butyl ether or similar groups.

The first polyether (A1) and the second polyether (A2) are preferably selected from the group consisting of polyethylene glycol, polypropylene glycol, polyethylene glycol-polypropylene glycol copolymers and monoethers thereof.

The polyethylene glycol-polypropylene glycol copolymers are preferably random or block copolymers.

It is particularly preferable when the first polyether (A1) is selected from the group consisting of
  a polyethylene glycol or a monoether thereof having a number-average molar mass Mn of less than 1000 g/mol, preferably 800 g/mol or less, more preferably 600 g/mol or less, and most preferably 400 g/mol or less to 200 g/mol or more,
  a polypropylene glycol or a monoether thereof having a number-average molar mass Mn of less than 2000 g/mol, preferably 1000 g/mol or less, more preferably 750 g/mol or less, and most preferably 600 g/mol or less to 400 g/mol or more, and
  a polyethylene glycol-polypropylene glycol copolymer or a monoether thereof having a number-average molar mass Mn of less than 2000 g/mol, preferably 1000 g/mol or less, more preferably 600 g/mol or less, to 300 g/mol or more.

In a particularly preferred embodiment the first polyether (A1) is a polyethylene glycol having a number-average molar mass Mn of less than 1000 g/mol, preferably 800 g/mol or less, more preferably 600 g/mol or less, and most preferably 400 g/mol or less to 200 g/mol or more.

Examples of component (A1) are polyethylene glycols having an Mn of about 200 g/mol (PEG 200), about 400 g/mol (PEG 400) or about 600 g/mol (PEG 600) or polypropylene glycols having an Mn of about 425 g/mol or about 725 g/mol.

The second polyether (A2) is preferably selected from, the group consisting of
  a polyethylene glycol or a monoether thereof having a number-average molar mass Mn of 1000 g/mol or more, preferably 2000 g/mol or more, more preferably 4000 g/mol or more, and most preferably 8000 g/mol or more to $10 \times 10^6$ g/mol or less and
  a polyethylene glycol-polypropylene glycol copolymer or a monoether thereof having a number-average molar mass Mn of 2000 g/mol or more, preferably 4000 g/mol or more, more preferably 8000 g/mol or more to $10 \times 10^6$ g/mol or less.

In a particularly preferred embodiment, the second polyether (A2) is a polyethylene glycol having a number-average molar mass Mn of 1000 g/mol or more, preferably 2000 g/mol or more, more preferably 4000 g/mol or more, a no; most preferably 8000 g/mol or more to $10 \times 10^6$ g/mol or less.

Examples of component. (A2) are polyethylene glycols having an Mn of about 1000 g/mol (PEG 1000), about 4000 g/mol (PEG 4000), about 8000 g/mol (PEG 8000), about 20,000 g/mol (PEG 20000).

The number-average molar mass Mn may be determined by end group analysis by $^1$H NMR spectroscopy or by wet chemistry by determination of the hydroxyl value. The determination of the hydroxy value may be effected according to DIN 53240-2 by acetylation of the OH groups and subsequent back-titration of the acetylation solution with KOH. The acetylation time should be at least 15 min. From the measured value in mg KOH/g of polyether the number-average molar mass of the polyether may then be calculated.

For high molecular weight polyethers having a very low end group density, the number-average molar mass Mn/the weight-average molar mass Mw may alternatively be determined by SEC (size exclusion chromatography).

In particular the weight-average molecular weight Mw and the number-average molecular weight Mn may be determined by size exclusion chromatography (SEC) as follows: against polyethylene oxide standard 22000, in 100 mmol/l of sodium nitrate with 10% acetonitrile, at 40° C./, flow rate 1.0 ml/min and triple detection (low-angle light scattering detector, refractive index detector and viscometry detector from Malvern-Viscotex) on an Ultrahydrogel 1000, 500, 250 column set from Waters Corp. USA with an injection volume of 100 µl.

Component (B)

Particulate rheology additives preferably comprise solid, fine inorganic particles.

If is preferable that the average particle size of the particulate rheology additives is <1000 nm, measured by means of photon-correlation spectroscopy on suitably dilute aqueous solutions, in particular with an average primary particle size of from 5 to 100 nm, determined by means of optical image evaluation on transmission electron micrographs. It is possible that these primary particles do not exist in isolation but instead are constituents of larger aggregates and agglomerates.

It is preferable that the particulate rheology additives are inorganic compounds, in particular metal oxides, particular preference being given to silicas. The specific surface area of the metal oxide is preferably from 0.1 to 1000 m²/g (by the BET method in accordance with DIN 66131 and 66132), particularly from 10 to 500 m²/g.

The metal oxide can have aggregates (definition in accordance with DIN 53206) in the range of diameters from 100 to 1000 nm, where the metal oxide has agglomerates (definition in accordance with DIN 53206) which are composed of aggregates and which can nave sizes from 1 to 1000 µm, depending on the exterior shear loading (e.g. resulting from the conditions of measurement).

For reasons associated with industrial handling, it is preferable that the metal oxide is an oxide having a proportion of covalent bonding in the metal oxide bond, preferably an oxide in the solid physical state of the elements of main groups and transition groups, for example the 3$^{rd}$ main group, an example being boron oxide, aluminium oxide, gallium oxide or indium oxide, or of the 4$^{th}$ main group, an example being silicon dioxide, germanium dioxide, or tin oxide or tin dioxide, lead oxide or lead dioxide, or an oxide of the 4$^{th}$ transition group, an example being titanium dioxide, zirconium oxide, or hafnium oxide. Other examples are stable oxides of nickel, of cobalt, of iron, of manganese, of chromium or of vanadium.

Particular preference is given to aluminium(III) oxides, titanium(IV) oxides and silicon(IV) oxides, for example silicas or silica gels produced by solution-chemistry methods, for example precipitated, or aluminium oxides, titanium dioxides or silicon dioxides produced in processes at elevated temperature, for example fumed aluminium oxides, titanium dioxides or silicon dioxides, or silica.

Other particulate rheology additives are silicates, aluminates or titanates, or aluminium phyllosilicates, for example bentonites, such as montmorillonites, or smectites or hectorites.

Particular preference is given to fumed silica, which is produced in a flame reaction preferably from silicon-halogen, compounds or organosilicon compounds, e.g. from silicon tetrachloride or methyldichlorosilane, or hydrogentrichlorosilane or hydrogenmethyldichlorosilane, or other methylchlorosilanes or alkylchlorosilanes, which may also be in the mixture with hydrocarbons, or any desired volatile or sprayable mixtures of organosilicon compounds, as mentioned, and hydrocarbons, e.g. in a hydrogen-oxygen, flame, or else a carbon monoxide-oxygen flame. The silica here can optionally be produced with or without addition of water, for example in the purification step; it is preferable not to add water.

It is preferable that the surface fractal dimension of the metal oxides and in particular the silicas is smaller than or equal to 2.3, particularly smaller than or equal to 2.1, in particular from 1.95 to 2.05, where the definition of the surface fractal dimension $D_S$ is as follows:

Particle surface A is proportional to the particle radius R raised to the power $D_S$.

The fractal dimension of the surface was determined by use of small-angle X-ray scattering (SAXS).

It is preferable that the mass fractal dimension $D_M$ of the metal oxides and in particular the silicas is smaller than or equal to 2.8, preferably smaller than or equal to 2.7, with particular preference from 2.4 to 2.6. The definition of the mass fractal dimension $D_M$ here is as follows:

Particle mass M is proportional to the particle radius R raised to the power $D_M$. The fractal dimension of the surface was determined by use of small-angle X-ray scattering (SAXS).

It is preferable that the particulate rheology additives (B) are non-polar, i.e. surface-modified, in particular, hydrophobized, preferably silylated fine inorganic particles. Preference is given in this connection to hydrophobic silicas, particularly hydrophobic fumed silicas.

The expression hydrophobic silica in this connection means non-polar silicas which have been surface-modified, preferably silylated, for example those described in the laid-open specifications EP 686676 B1, EP 1433749 A1 and DE 102013226494 A1.

The meaning of this for the silicas used according to the invention is that the surface of the silica has been hydrophobized, i.e. silylated.

It is preferable that the hydrophobic silicas used according to the invention have been modified, i.e. silylated, with organosilicon compounds, e.g.

(i) organosilanes or organosilazanes of the formula (II)

$$R^1{}_d SiY_{4-d} \quad (II)$$

and/or partial hydrolysates of these,
where
$R^1$ can be identical or different and is a monovalent, optionally substituted optionally mono- or polyunsaturated, optionally aromatic hydrocarbon moiety having from 1 to 24 carbon atoms which are optionally interrupted by oxygen atoms,
d is 1, 2 or 3 and
Y can be identical or different and is halogen atom, monovalent Si—N-bonded nitrogen moieties on which there can be a further silyl moiety bonded, —OR² or —OC(O)OR², where R² is hydrogen atom or a monovalent, optionally substituted, optionally mono- or polyunsaturated hydrocarbon moiety which is optionally interrupted by oxygen atoms,
or
(ii) linear, branched or cyclic organosiloxanes made of units of the formula (III)

$$R^3{}_e(OR^4)_f SiO_{(4-e-f)/2} \quad (III),$$

where
$R^3$ can be identical or different and complies with one of the definitions provided above for $R^1$, $R^4$ can be identical or different and complies with a definition provided for $R^3$,
e is 0, 1, 2 or 3,
f is 0, 1, 2, 3, with the proviso that the sum e+f is ≤3, and the number of these units per moiety is at least 2;
or
mixtures of (i) and (ii) are used.

The organosilicon compounds which can be used for the silylation of the silicas can by way of example be mixtures of silanes or silazanes of the formula (II), preference being given here to those made of methylchlorosilanes on the one hand, or alkoxysilanes and optionally disilazanes on the other.

Examples of $R^1$ in formula (II) are preferably the methyl, octyl, phenyl and vinyl moieties, particular preference being given to the methyl moiety and the phenyl moiety.

Examples of $R^2$ are the methyl, ethyl, propyl and octyl moieties, preference being given here to the methyl and ethyl moiety.

Preferred examples of the organosilanes of the formula (II) are alkylchlorosilanes, such as methyltrichlorosilane, dimethyldichlorosilane, trimethylchlorosilane, octylmethyldichlorosilane, octyltrichlorosilane, octadecymethyldichlorosilane and octadecyltrichlorosilane, methylmethoxysilanes, such as methyltrimethoxysilane, dimethyidimethoxysilane and trimethylmethoxysilane, methylethoxysilanes, such as methyltrietboxysilane, dimethyldiethoxysilane and trimethylethoxysilane, methylacetoxysilanes, such as methyltriacethoxysilane, dimethyldiacethoxysilane and trimethylacethoxysilane, phenylsilanes, such as phenyltrichlorosilane, phenylmethyldichlorosilane, phenyidimethylchlorosilane, phenyltrimethoxysilane, phenylmethyidimethoxysilane, phenyldimethylmethoxysilane, phenyltriethoxysilane, phenylmethyldiethoxysilane and phenyldimethylethoxysilane, vinylsilanes, such as vinyltrichlorosilane, vinylmethyldichlorosilane, vinyldimethylchlorosilane, vinyltrimethoxysilane, vinylmethyldimethoxysilane, vinyldimethylmethoxysilane, vinyltriethoxysilane, vinylmethyldiethoxysilane and vinyldimethylethoxysilane, disilazanes such as hexamethyldisilazane, divinyltetramethyldisilazane and bis(3,3-trifluoropropyl)tetramethyldisilazane, cyclosilazanes such, as octamethylcyclotetrasilazane, and silanols such as trimethylsilanol.

Particular preference is given to methyltrichlorosilane, dimethyldichlorosilane and trirmethylchlorosilane or hexamethyldisilazane.

Preferred examples of organosiloxanes of the formula (III) are linear or cyclic dialkylsiloxanes having an average number of dialkylsiloxy units greater than 3. The dialkylsiloxanes are preferably dimethylsiloxanes. Particular preference is given to linear polydimethylsiloxanes having the following terminal groups: trimethylsiloxy, dimethylhydroxysiloxy, dimethylchlorosiloxy, methyldiclorosiloxy, dimethylmethoxysiloxy, methyldimethoxysiloxy, dimethylethoxysiloxy, methyldiethoxysiloxy, dimethylacethoxysiloxy, methyldiacethoxysiloxy and dimethylhydroxysiloxy group, in particular having terminal trimethyisiloxy or dimethylhydroxysiloxy groups.

The viscosity of the polydimethylsiloxanes mentioned is preferably from 2 to 100 mPa·s at 25° C.

The silanol group density of the hydrophobic silicas used according to the invention is preferably smaller than 1.8 silanol groups $nm^2$, preferably at most 1.0 silanol groups per $nm^2$ and more preferably at most 0.9 silanol groups per $nm^2$.

The carbon content of the hydrophobic silicas used according to the invention is preferably greater than or equal to 0.4% by weight of carbon, with preference from 0.5% by weight to 15% by weight of carbon and with particular preference from 0.75% to 10% by weight of carbon, where the weight is based on the hydrophobic silica.

The methanol number of the hydrophobic silicas used according to the invention is preferably at least 30, with preference at least 40 and with particular preference at least 50.

The DBP number (dibutyl phthalate number) of the hydrophobic silicas used according to the invention is preferably smaller than 250 g/100 g, with preference from 150 g/100 g to 250 g/100 g.

The tamped density of the hydrophobic silicas used according to the invention, measured in accordance with DIN EN ISO 787-11, is preferably from 20 g/l to 500 g/l, with preference from −30 to 200 g/l.

The silanol group density is determined by means of acid-base titration, as disclosed by way of example in G. W. Sears, Anal. Chem. 1956, 28, 1981.

The carbon content can be determined by elemental analysis. The methanol number is the percentage proportion of methanol that has to be added to the aqueous phase in order to achieve complete wetting of the silica. The expression complete wetting here means that all of the silica sinks in the water-methanol test liquid.

The analytical methods used to characterize component (B) are moreover stated in more detail below in the Examples section.

Particulate rheology additive (B) used can comprise any desired mixtures of fine inorganic particles, and in particular it is possible to use mixtures of various silicas, e.g. mixtures of silicas of different BET surface area, or mixtures of silicas with different silylation or mixtures of unmodified and silylated silicas.

Preference is given to the case of mixtures of silylated, e.g. hydrophobic, non-polar silicas and unmodified, i.e. hydrophilic, polar silicas, the proportion of the hydrophobic silicas, based on the total quantity of silica, being at least 50 per cent of weight (% by weight), preferably at least 80% by weight and more preferably at least 90% by weight.

The specific surface area of the unmodified i.e. hydrophilic, polar silicas is preferably from 0.1 to 1000 $m^2/g$, particularly preferably from 10 to 500 $m^2/g$ (measured by the BET method in accordance with DIN 66131 and 66132).

The silanol group density of the unmodified, i.e. hydrophilic, polar silicas is preferably from 1.8 silanol groups per $nm^2$ to 2.5 silanol groups per $nm^2$, with preference from 1.8 silanol groups per $nm^2$ to 2.0 silanol groups per $nm^2$.

The methanol number of the unmodified, i.e. hydrophilic, polar silicas is smaller than 30, preferably smaller than 20, more preferably smaller than 10, and in one specific embodiment the unmodified, i.e. hydrophilic, polar silicas are completely wetted by wafer without addition of methanol.

The tamped density of the unmodified, i.e. hydrophilic, polar silicas, measured in accordance with DIN EN ISO 787-11, is from 20 g/l to 500 g/l, preferably from 30 to 200 g/l and more preferably from 30 to 150 g/l.

The DBP number (dibutyl phthalate number) of the unmodified, i.e. hydrophilic, polar silicas used according to the invention is preferably smaller than 300 g/100 g, with preference from 150 g/100 g to 280 g/100 g.

Other Additional Substances (C)

The sm (6a) of the invention can comprise other additional functional substances, for example
  colours, such as organic or inorganic colour pigments or molecularly soluble dyes;

solvents conventionally used in industry, for example water, acetone, alcohols, aromatic or aliphatic hydrocarbons;

stabilizers, such as heat stabilizers or UV stabilisers;

UV tracers, such as fluorescence dyes, e.g. rhodamines, fluoresceins or other tracers for the detection of residual traces of sm on components polymers, such as polymeric rheology additives or levelling aids;

fillers, such as nonreinforcing fillers, for example fillers with BET surface area up to 50 m$^2$/g, for example quartz, diatomaceous earth, calcium silicate, zirconium silicate, zeolites, aluminium oxide, titanium oxide, iron oxide, zinc oxide, barium sulphate, calcium carbonate, gypsum, silicon nitride, silicon carbide, phyllosilicates, such as mica, montmorillionites, boron nitride, glass, and plastics powder water scavengers or desiccants, for example molecular sieves or hydratable salts such as anhydrous $Na_2SO_4$, with average particle size smaller than 500 μm, preferably smaller than 100 μm, more preferably smaller than 50 μm, measured by means of laser diffraction.

The Supportive Material (6a) of the Invention

The sm (6a) of the invention is preferably composed of
from 65% by weight to 99% by weight of (A),
from 1% by weight to 10% by weight of B) and
from 0% by weight to 25% by weight of (C);
it is particularly preferable that the sm (6a) of the invention is composed of
from 92% by weight to 98% by weight of (A),
from 2% by weight to 8% by weight of (B) and
from 0% by weight to 10% by weight of (C),
it is especially preferable that the sm (6a) according to the invention is composed of
from 84% by weight to 96% by weight of (A),
from 4% by weight to 6% by weight, of (B) and
from 0% by weight to 10% by weight of (C).

The use of a second polyether (A2) having a melting point of 35° C. or higher in the component (A) has the result that the sm exhibits a relatively smooth surface. In addition the use of the second polyether (A2) has the result that the sm solidifies in the cooled state (below 60° C.) and accordingly exhibits increased stability compared to gels known in the prior art. At higher temperatures (above 60° C.) particulate rheological additive helps the sm to achieve sufficient viscoelasticity and stability.

The sm (6a) of the invention is in particular characterized in that it has pseudoplastic and viscoelastic properties at 70° C.

Pseudoplastic properties mean that the viscosity $\eta(\gamma)$ of the sm (6a) depends on the shear rate $\gamma$ and falls as shear rate increases; this effect is reversible, and the viscosity in turn increases when shear rate decreases.

At 70° C., it is preferable that the sm (6a) used according to the invention has high viscosity at low shear rate. It is preferable that the value of the viscosity, measured at shear rate 1 s$^{-1}$ at 70° C. is 10 Pas or more, preferably from 15 Pas to 1000 Pas, particularly preferably from 20 Pas to 500 Pas and in a particular embodiment, from 25 Pas to 250 Pas.

At 70° C., the sm (6a) used according to the invention has low viscosity at high shear rate. The value of the viscosity, measured at shear rate 100 s$^{-1}$ at 70° C. is 10 Pas or less, preferably from 0.1 Pas or more to 10 Pas or less, more preferably from 1 Pas or more to 10 Pas or less and in a particular embodiment, from 1 Pas or more to 7 Pas or less.

The method for viscosity shear viscosity) determination is described in detail at a later stage below in the context of the Examples.

At 70° C., it is preferable that the sm (6a) used according to the invention has thixotropic behaviour, i.e. by way of example, the increase of shear viscosity after reduction of shear rate from 500 s$^{-1}$ to 1 s$^{-1}$ is time-dependent.

It is preferable that the shape or the curve for this viscosity increase is concave, i.e. curves towards the abscissa.

It is preferable when the reconstruction of the viscosity after reduction of the shear rate from 500 s$^{-1}$ s$^{-1}$ is complete after not more than 10 s. This means that upon instantaneous reduction of the shear rate from 500 s$^{-1}$ to 1 s$^{-1}$ the viscosity of the sample has reached a stable plateau value after not more than 10 seconds.

The sm (6a) used according to the invention is moreover characterized in that it exhibits viscoelastic behaviour at 70° C., and in particular preferably exhibits viscoelastic solid properties in the linear-viscoelastic (LVE) range. This means that, within the LVE range, defined according to T. Merger, G., The Rheology Handbook, 2nd Edn., Vincentz Network GmbH & Co. KG; Germany, 2006, 147ff., the value of the loss factor tan δ=G"/G' is smaller than 1, preferably smaller than 0.75 and more preferably smaller than 0.5.

The sm (6a) used according to the invention is moreover characterised in that at 70° C., it is preferably a stable physical gel. This means that the plateau value of the storage modulus G' within the LVE range at 70° C. is greater than 100 Pa and preferably lies in the range from 100 to 5000 Pa and more preferably in the range from 100 to 2500 Pa.

The gel is moreover characterized in that the value of the critical flow stress $\tau_{crit}$, the stress t at which G'=G" is preferably greater than 1 Pa, preferably greater than 5 Pa and more preferably greater than 25 Pa. The storage modulus G' may be determined by rheological measurements using a rheometer.

The sm (6a) employed according to the invention exhibit a phase transition in the temperature range from 20° C. to 60° C. I.e. upon cooling in a temperature range from 20° C. to 60° C. the sm (6a) employed according to the invention exhibit a transition from a liquid with viscoelastic behavior to a solid body. The solidification temperature $T_S$ assigned to this phase transition was obtained from a temperature sweep experiment under dynamic stress of the sample with constant deformation and frequency with cooling in the temperature range from 70° C. to 20° C. To this end the measured values of the magnitude of the complex viscosity |η*|(T) were analyzed using the Boltzmann sigmoidal function. The solidification temperature $T_S$ of the sm (6a) is in the range from 20° C. or more to 60° C. or less, preferably in the range from 25° C. or more to 50° C. or less. It is preferable when the solidification is effected in a narrow temperature range, i.e. the solidification curve |η*|(T) is steep. This means that the gradient parameter dT of the Boltzmann sigmoidal function has a value of 0.1 to 1, preferably 0.25 to 0.75.

The sm (6a) used according to the invention is moreover characterized in that silicones can spread on the surface of the sm (6a). This means that the contact angle of a low-molecular-weight silicone oil (e.g. AK 100 from Wacker Chemie AG) is smaller than 90°, preferably smaller than 60°, and that most preferably, spontaneous wetting of the sm occurs without formation of any measurable contact angle.

The sm (6a) used according to the invention is moreover characterized in that it does not change when briefly irradiated with electromagnetic radiation, e.g. with UV light in the context, of the radiation-crosslinking of the sfm (6b), i.e. exhibits no degradation reactions, polymerization reactions or loss of stability.

The sm (6a) used according to the invention is preferably characterized in that, after hardening of the sfm (6b), it can easily be removed from the moulding (8) mechanically or via dissolution in a solvent. This can be achieved mechanically, e.g. by means of compressed air, spinning, e.g. by means of a centrifuge, brushes, scrappers or the like. Removal can moreover be achieved via solution in a suitable solvent. Preference is given here to solvents that do not endanger the environment or the end user, preferably water.

It is preferable when the sm (6a) used according to the invention and in particular the employed polyethers exhibit good solubility in water. This means that at 20° C. at least 5 g of sm dissolve in 100 g of water, preferably at least 50 g of sm dissolve in 100 g of water and more preferably at least 100 g of sm dissolve in 100 g of water.

This furthermore means that the employed polyethers dissolve to an extent of at least 5 g in 100 g of water, preferably dissolve to an extent of at least 50 g in 100 g of water and more preferably dissolve to an extent of at least 100 g of sm in 100 g of water, in each case at 20° C.

The solvent is preferably heated for this purpose and/or in particular suitable surfactants are added to the water, examples being anionic, cationic or neutral surfactants. Washing can optionally be achieved in a machine, for example in a suitable dishwashing machine.

It is preferable that the sm (6a) used according to the invention is recycled after removal from the moulding (8). To this end, it has proved advantageous for the sm (6a) used according to the invention to have low absorption capacity for volatile constituents of the sfm (6b), for example low-molecular-weight siloxanes in the case of silicone elastomers as sfm (6b).

When the sm dispersions comprising particulate rheology additives (B) are produced the particulate rheology additives (B) are mixed into the polyether composition (A).

For the production of the sm dispersions at temperatures above the fixed point of the component (A2) and preferably above 70° C., the particulate rheology additives (B) can be added to the liquid polyether composition (A) and distributed by wetting, or by shaking, for example by use of a tumbler mixer, or of a high-speed mixer, or can be mixed by stirring. In the case of low particle concentrations below 10% by weight, simple stirring is generally sufficient for the incorporation of the particles (B) into liquid (A). Preference is given to a very high shear gradient being present for the incorporation and dispersion of particles (B) into the liquid polyether composition (A). Preference is given to the following for this purpose: high-speed stirrers, high-speed dissolvers, e.g. with peripheral velocities of from 1 to 50 m/s, high-speed rotor-stator systems, Sonolators, nips, nozzles, ball mills, etc.

Batchwise and continuous methods can be used for this, preference being given to continuous methods.

Suitable systems are in particular those that initially use effective stirrer units to achieve the wetting and incorporation of the particulate rheology additives (B) into the polyether composition (A) for example in a closed vessel or tank and, in a second step, use a very high shear gradient to disperse the particulate rheology additives (B). This can be achieved via a dispersion system in the first vessel, or by pumped circulation from the vessel into external pipings, which comprises a dispersion unit, preferably with closed-circuit return to the vessel. This procedure can preferably be designed to be continuous by using partial return and partial continuous removal.

In particular, the use of ultrasound in the range from 5 Hz to 500 kHz, preferably from 10 kHz to 100 kHz, most preferably from 15 kHz to 50 kHz, is a suitable method of dispersing the particulate rheology additives (B) in the sm dispersion; the ultrasonic dispersion procedure can take place continuously or batchwise. This can be achieved via individual ultrasonic transmitters, such as ultrasonic tips, or in through-flow systems which comprise one or more ultrasonic transmitters, optionally being systems separated via piping or via a pipe wall.

Ultrasonic dispersion can take place continuously or batchwise.

Dispersion can be achieved in conventional mixing equipment suitable for the production of emulsions or dispersions and providing a sufficiently large supply of shear energy, for example high-speed stator-rotor stirrer equipment, for example as designed by Prof. P. Willems, known by the registered trademark "Ultra-Turrax", or in other stator-rotor systems known by registered trademarks such as Kady, Unimix, Koruma, Cavitron, Sonotron, Netzsch or Ystral. Other processes are ultrasonic processes using, for example, ultrasonic ("US") probes/transmitters and US through-flow cells, and US systems or similar to those supplied by Sonorex/Bandelin, and ball mills, for example the Dyno-Mill from WAB, CH. Other processes use high-speed stirrers, such as blade stirrers or paddle stirrers, dissolvers such as disc dissolvers, for example from Getzmann, and mixing systems such as planetary dissolvers, paddle dissolvers and other combined assemblies derived from dissolver systems and stirrer systems. Other suitable systems are extruders and kneaders.

It is preferable that the incorporation and dispersion of the particulate rheology additives (B) takes place in vacuo or includes an evacuation step.

It is preferable that, the incorporation and dispersion of the particulate rheology additives (B) takes place at elevated temperature in the temperature range from 30° C. to 280° C., with preference from 50° C. to 150° C. and with particular preference from 70° C. to 100° C.

The temperature rise can preferably be controlled via external heating/cooling.

It is, of course, also possible to produce the sm dispersion by another method.

It is preferable that the sm (6a) used according to the invention is charged to suitable metering containers (4a), examples being cartridges, tubular bags, and the like. It is preferable that the metering containers (4a) are then welded into another material, e.g. into metallized foil, to prevent ingress of atmospheric moisture.

It is preferable that the sm (6a) used according to the invention is degassed before and/or during charging to the container, for example by applying a suitable vacuum or by means of ultrasound.

It is preferable that the sm (6a) used according to the invention is dried before charging to the container, for example by applying a suitable vacuum at elevated temperature. The content of free water in the sm (6a) used, i.e. water not bound to water scavenger or desiccant, is less than 10% by weight, preferably less than 5% by weight, and more preferably less than 1% by weight based on the overall weight of the sm. The content of free water can, by way of example, be determined quantitatively by means of Karl Fischer titration or NMR spectroscopy.

It is preferable when the filling of the sm (6a) employed according to the invention is effected at elevated temperature in a temperature range from 30° C. to 200° C., preferably 50° C. to 150° C. and more preferably 70° C. to 100° C.

It is preferable that the sm (6a) used according to the invention is delivered from the metering containers via mechanical pressure and/or by means of air pressure or vacuum.

It is preferable when the delivery of the sm (6a) employed according to the invention from the metering containers is effected at elevated temperature in a temperature range from 30° C. to 100° C., preferably 40° C. to 100° C. and more preferably 50° C. to 100° C.

EXAMPLES

The following examples serve for illustration of the present invention, without restriction of the same.

All percentage data are based on weight. Unless otherwise stated, all operations are carried out at room temperature, 25° C., and at atmospheric pressure (1013 bar). The apparatuses are commercially available laboratory equipment of the types supplied commercially by numerous equipment producers.

Analytical Methods for the Characterization of the Silicas (Component B)

Methanol Number

Test of wettability with water-methanol mixtures (% by volume of MeOH in water): equal volumes of silica and water-methanol mixture are shaken together starting with 0% of methanol in the event of non-wetting at least some of the silica floats: a mixture with the proportion of MeOH increased by 5% by volume is to be used in the event of wetting the entire volume of the silica sinks: the proportion of MeOH (% by volume) in water gives the methanol number.

Carbon Content (% of C)

Elementary analysis for carbon was carried out in accordance with DIN ISO 10694 by using a CS-530 elemental analyser from Eltra GmbH (D-41469 Neuss).

Residual Silanol Content

Residual silanol content was determined in accordance with G. W. Sears et al. Analytical Chemistry 1956, 28, 1981ff by means of acid-base titration of the silica suspended in a 1:1 mixture of water and methanol. The titration was carried out in the region above the isoelectric point and below the pH range of dissolution of the silica. Residual silanol content in % can accordingly be calculated from the following formula:

SiOH=SiOH(silyl)/SiOH(phil)100% where

SiOH(phil): titration volume from titration of the untreated silica

SiOH(silyl): titration volume from titration of the silylated silica

DBF Number

Dibutyl phthalate absorption is measured with RHEO-CORD 90 from Haake, Karlsruhe. For this, 12 g±0.001 g of the silicon dioxide powder are charged to a kneading chamber, which is sealed by a cover, and dibutyl phthalate is metered into the chamber by way of a hole in the cover at a prescribed metering rate of 0.0667 ml/s. The kneader is operated with a motor rotation rate of 125 revolutions per minute. Once the torque maximum has been reached, the kneader and the DBP metering are automatically switched off. The quantity of DBP consumed and the input quantity of the particles are used to calculate the DBP absorption as follows: DBP number (g/100 g)=(quantity consumed of DBP in g/input weight of powder in g)×100.

Rheological Measurements

Unless otherwise stated, all measurements were made in an MCR 302 air-bearing rheometer from Anton Paar at 70° C. Measurements were made with plate-on-plate geometry (diameter 25 mm) with gap width 300 μm. Excess sample material was removed ("trimmed") by a spatula once the plates had been closed to give the gap for the test. Before the actual profile was measured, the sample was subjected to a defined pre-shear in order to eliminate the rheological history derived from sample application and closing of the plates to the position for the test. The pre-shear comprised a shear phase of 60 s at shear rate 100 s$^{-1}$ followed by a minimal-shear phase of 300 s. The shear viscosities were determined from what is known as a stepped profile, where the sample was sheared at a constant shear rate of 1 s$^{-1}$, 10 s$^{-1}$ and 100 s$^{-1}$ in each case for 120 s. Measurement point duration here was 12 s (1 s$^{-1}$) and 10 s (10 s$^{-1}$, 100 s$^{-1}$), and the average of the final 4 data points of a block was taken to give the shear viscosity.

The loss factor tan δ, the critical shear stress $T_{crit}$ and the plateau value of the storage modulus G' were obtained from a dynamic deformation test in which the sample was subjected to load at a constant angular frequency of 10 rad/s with increasing deformation amplitude with controlled deformation in the deformation range from 0.01 to 100. Measurement point duration was 30 s with 4 measurement points per decade. The plateau value of the storage modulus G' here is the average of data points 2 to 7, with the proviso that these are within the linear-viscoelastic range, i.e. exhibit no dependency on deformation or shear stress.

The value selected for the loss factor tan δ was the value at the 4$^{th}$ measurement point.

The solidification temperature $T_S$ of the sm was obtained from a temperature sweep experiment under dynamic shear stress. The sample was cooled in a stepwise manner here from 70° C. to 20° C. at a cooling rate: of 1-5 K/min. The sample was stressed here with a constant deformation of 0.1% at a constant frequency of 10 Hz. Measurement point duration was 0.067 min. This affords the storage modulus G' (T), the loss modulus G" (T) and the complex viscosity |η*|(T), in each case as a function of the temperature T. A plot of |η*|(T) against T affords a sigmoid curve. Using the Boltzmann sigmoidal function the solidification temperature $T_S$ and the steepness of the curve we re determined as follows from the curve:

The Boltzmann sigmoidal function here has the form $$|\eta|^*(T) = \frac{|\eta|^*_{max} - |\eta|^*_{min}}{1 + e^{(T-T_0)/dT}} - |\eta|^*_{min}.$$

|η|*(T) is the magnitude of the complex viscosity as a function of the temperature, |η|*$_{max}$ is the the plateau value of the magnitude of the complex viscosity at low temperature, |η|*$_{min}$ is the plateau value of the magnitude of the complex viscosity at high temperature, T is the temperature in ° C., $T_0$ is the point of inflection and is here defined as the solidification temperature $T_S$ in ° C. and dT is the gradient parameter which describes the steepness of the curve. The function was fitted to the measured values using the software ORIGIN 2016G. The iteration algorithm used was the software-implemented Levenberg Marquardt algorithm. The fitting process was terminated automatically as soon as the fit converged and the chi square value of $1\times10^{-9}$ was achieved. The plateau values $|\eta|^*_{max}$ and $|\eta|^*_{min}$ were determined from the measured values by averaging the first 10 and last 10 measured values and fixed in the context of the curve fitting. The parameters $T_0$ and dT were freed for the iteration.

3D Printer: The examples described below of the process of the invention used, as generative manufacturing system, a NEO 3D printer from German RepRap GmbH, which was modified and appropriately adapted for the tests. The thermoplastic filament metering unit originally installed in the NEO 3D printer was replaced by a jetting nozzle from Vermes Microdispensing GmbH, Otterfing, in order to permit deposition in droplet form of compositions ranging from those having relatively high viscosity to those that are self-supporting pastes, an example being the sm used according to the invention.

Because the NEO printer was not equipped as standard for the installation of jetting nozzles, it was modified. The Vermes jetting nozzle was incorporated into the printer control system in such a way that the start-stop signal (trigger signal) of the Vermes jetting nozzle was actuated by the G-code control system of the printer. To this end, a specific signal was stored, in the G-code control system. The G-code control system of the computer therefore merely switched the jetting nozzle on and off (start and stop of metering). For the transmission of the start-stop signal, the heating cable of the originally installed filament heating nozzle of the NEO printer was separated and connected to the Vermes nozzle.

The other metering parameters (metering frequency, rising, falling, etc.) of the Vermes jetting nozzle were adjusted by means of the MDC 3200+ Microdispensing Control Unit.

The 3D printer was controlled by means of a computer. The software control system and control signal interface of the 3D printer (Repitier-Host software) were modified so as to permit control not only of the movement of the metering nozzle in the three spatial directions but also of the droplet deposition signal. The maximal displacement velocity of the NEO 3D printer is 0.3 m/s.

Metering system: The metering system, for the sm compositions used, or the radiation-crosslinking silicon-elastomer structural material, was the MDV 3200 A microdispensing metering system, from Vermes Microdispensing GmbH, consisting of a complete system with the following components: a) MDV 3200 A nozzle unit with connection system for Luer-taper cartridges, to the upper side of which compressed air at from 3 to 8 bar was applied (flexible tube with adapter), b) Vermes MDH-230tfl ancillary nozzle heating system on left-hand side, c) MCH30-230 cartridge heating with MCH compressed air relief for fixing a hotmelt cartridge, MHC 3002 micro dispensing heating controller and MCH-230tg heating cable d) MDC 32001 MicroDispensing Control Unit, which in turn had connection to the PC control system and also, by way of moving cables, to the nozzle, permitted adjustment of the metering parameters for jetting (Rising, Falling, Opentime, Needlelift, Delay, No Pulse, Heater, Nozzle, Distance, Voxel Diameter, Admission Air Pressure at Cartridge). Nozzles with diameters 50, 100, 150 and 200 μm are available. It is thus possible to achieve accurate placing of very fine droplets of sm (6a) in the nanolitre range on any desired xyz position on the baseplate or on the crosslinked sfm (6b). Unless otherwise stated in the individual Examples, a 200 μm nozzle (nozzle insert N11-200) was installed as standard nozzle insert in the Vermes valve.

Storage containers (4a) used for the sm composition (6b) were vertically positioned 30 ml Luer-taper cartridges, connected to the dispensing nozzle by screw thread preventing liquid leakage; compressed air was applied to the cartridges. The modified NEO 3D printer and the Vermes metering system were controlled by a PC and Simplify 3D open-source software.

Radiation Source:
UV Chamber with Osram UV Lamp

For off-line UV irradiation for the crosslinking of the sfm (6b) of components, a UV irradiation chamber was used which had a reflective internal finish and the following external dimensions:

| Length | 50 cm |
| Height | 19 cm |
| Width | 33 cm |

The distance between the fluorescent UV lamp and the substrate was 15 cm.

Radiation source: Osram Puritec HNS L 36 W 2G11 with wavelength 254 nm, UV lamp with electrical power rating 36 watts, Osram GmbH, Steinerne Furt 62, 86167 Augsburg.

Conditioning of the sm Compositions and sfm Compositions: All of the sfm compositions used were devolatilized before use in a 3D printer by storing 100 g of the composition in an open PE jar for 3 h in a desiccator in vacuo at 10 mbar and room temperature (=25° C.). Under conditions excluding air, the composition was then charged to a 30 ml cartridge with bayonet seal, and sealed by an appropriately sized ejector piston (made of plastic). The Luer-taper cartridge was then screwed into the vertical cartridge holder of the Vermes metering valve in a manner that prevented escape of liquid with the Luer-taper screw thread downwards and compressed air at from 3 to 8 bar was applied to the piston upper side of the cartridge; the ejector piston located in the cartridge prevents passage of the compressed air into the previously evacuated composition without any bubbles.

The sm compositions were melted in a nitrogen-purged drying cabinet at 70° C. overnight, filled into cartridges and centrifuged not for 5 min at 2000 rpm to free them of air. The Luer lock cartridge was then liquid-tightly screwed into the vertical cartridge heating of the Vermes metering valve with the Luer lock screw pointing downward and the pressure plunger at the cartridge topside was subjected to 3-8 bar of compressed air; the expulsion plunger present in the cartridge prevents the compressed air from getting into the composition that had previously been centrifuged to free it of bubbles. The cartridges were temperature controlled to the target temperature for at least 30 min before commencement of the printing operation.

Example 1 (E1)

A mixture of 237.5 g of the polyethylene glycol with average molar mass Mn 600 g/mol (PEG 600, melting point: 17° C.) and 237.5 g of a polyethylene glycol with average molar mass Mn 8000 g/mol (PEG 8000, melting point: 55° C.) were used as initial charge in a laboratory mixer from PC Labor system GmbH with paddle dissolver (dissolver disc diameter 60 mm), and 25.0 g of HDK® H18 hydrophobic fumed silica (obtainable from Wacker Chemie AG; for analytical data see Table 1) were added in portions, with stirring, over a period of about 1 h at a temperature of 70°

C. The mixture was then dispersed at 70° C. for 1.0 h in vacuo at 800 rpm. This gave a clear gel, which solidifies at temperatures below 60° C. to give a white composition, and analytical data for which are collated in Table 2.

Example 2 (E2)

A mixture of 356.2 g of the polyethylene glycol with average molar mass Mn 600 g/mol (PEG 600, melting point: 17° C.) and 118.8 g of a polyethylene glycol with average molar mass Mn 8000 g/mol (PEG 8000, melting point: 55° C.) were used as initial charge in a laboratory mixer from PC Laborsystem GmbH with paddle dissolver (dissolver disc diameter 60 mm), and 25.0 g of HDK® H18 hydrophobic fumed silica (obtainable from Wacker Chemie AG; for analytical data see Table 1) were added in portions, with stirring, over a period of about 1 h at a temperature of 70° C. The mixture was then dispersed at 70° C. for 1 h in vacuo at 800 rpm. This gave a clear gel, which solidifies at temperatures below 60° C. to give a white composition, and analytical data for which are collated in Table 2.

Example 3 (E3)

A mixture of 356.2 g of the polyethylene glycol with average molar mass Mn 600 g/mol (PEG 600, melting point: 17° C.) and 118.8 g of a polyethylene glycol with average molar mass Mn 20,000 g/mol (PEG 20000, melting point: 57° C.) were used as initial charge in a laboratory mixer from PC Laborsystem GmbH with paddle dissolver (dissolver disc diameter 60 mm), and 25.0 g of HDK® H18 hydrophobic fumed silica (obtainable from Wacker Chemie AG; for analytical data see Table 1) were added in portions, with stirring, over a period of about 1 h at a temperature of 70° C. The mixture was then dispersed at 70° C. for 1.0 h in vacuo at 800 rpm. This gave a clear gel, which solidifies at temperatures below 60° C. to give a white composition, and analytical data for which are collated in Table 2.

Example 4 (E4)

A mixture of 234.5 g of the polyethylene glycol with average molar mass Mn 600 g/mol (PEG 600, melting point: 17° C.) and 234.5 g of a polyethylene glycol with average molar mass Mn 20,000 g/mol (PEG 20000, melting point: 57° C.) were used as initial charge in a laboratory mixer from PC Laborsystem GmbH with paddle dissolver (dissolver disc diameter 60 mm), and 25.0 g of HDK® H18 hydrophobic fumed silica (obtainable from Wacker Chemie AG; for analytical data see Table 1) were added in portions, with stirring, over a period of about 1 h at a temperature of 70° C. The mixture was then dispersed at 70° C. for 1.0 h in vacuo at 800 rpm. This gave a clear gel, which solidifies at temperatures below 60° C. to give a white composition, and analytical data for which are collated in Table 2.

Example 5 (E5)

A mixture of 234.5 g of the polyethylene glycol with average molar mass Mn 600 g/mol (PEG 600, melting point: 17° C.) and 234.5 g of a polyethylene glycol with average molar mass Mn 4000 g/mol (PEG 4000, melting point: 53° C.) were used as initial charge in a laboratory mixer from PC Laborsystem GmbH with paddle dissolver (dissolver disc diameter 60 mm), and 25.0 g of HDK® H18 hydrophobic fumed silica (obtainable from Wacker Chemie AG; for analytical data see Table 1) were added, in portions, with stirring, over a period of about 1 h at a temperature of 70° C. The mixture was then dispersed at 70° C. for 1.0 h in vacuo at 800 rpm. This gave a clear gel, which solidifies at temperatures below 60° C. to give a white composition, and analytical data for which are collated in Table 2.

Example 6 (E6)

A mixture of 350.7 g of the polyethylene glycol with average molar mass Mn 600 g/mol (PEG 600, melting point: 17° C.) and 117.3 g of a polyethylene glycol with average molar mass Mn 20,000 g/mol (PEG 20000, melting point: 57° C.) were used as initial charge in a laboratory mixer from PC Laborsystem GmbH with paddle dissolver (dissolver disc diameter 60 mm), and 20.0 g of HDK® H18 hydrophobic fumed silica (obtainable from Wacker Chemie AG; for analytical data see Table 1) were added in portions, with stirring, over a period of about 1 h at a temperature of 70° C. The mixture was then dispersed at 70° C. for 1.0 h in vacuo at 800 rpm. This gave a clear gel, which solidifies at temperatures below 60° C. to give a white composition, and analytical data for which are collated in Table 2.

Example 7 (E7)

A mixture of 344.0 g of the polyethylene glycol with average molar mass Mn 600 g/mol (PEG 600, melting point: 17° C.) and 114.5 g of a polyethylene glycol with average molar mass Mn 20000 g/mol (PEG 20000, melting point: 57° C.) were used as initial charge in a laboratory mixer from PC Laborsystem GmbH with paddle dissolver (dissolver disc diameter 60 mm), and 30.0 g of HDK® H18 hydrophobic fumed silica (obtainable from Wacker Chemie AG; for analytical data see Table 1) were added in portions, with stirring, over a period of about 1 h at a temperature of 70° C. The mixture was then dispersed at 70° C. for 1.0 h in vacuo at 800 rpm. This gave a clear gel, which solidifies at temperatures below 60° C. to give a white composition, and analytical data for which are collated in Table 2.

Example 8 (E8)

A mixture of 348.0 g of the polyethylene glycol with average molar mass Mn 400 g/mol (PEG 400, melting point: 4° C.) and 116.0 g of a polyethylene glycol with average molar mass Mn of 20,000 g/mol (PEG 20000, melting point: 57° C.) were used as initial charge in a laboratory mixer from PC Laborsystem GmbH with paddle dissolver (dissolver disc diameter 60 mm), and 25.0 g of HDK® H18 hydrophobic fumed silica (obtainable from Wacker Chemie AG; for analytical data see Table 1) were added in portions, with stirring, over a period of about 1 h at a temperature of 70° C. The mixture was then dispersed at 70° C. for 1.0 h in vacuo at 800 rpm. This gave a clear gel, which solidifies at temperatures below 60° C. to give a white composition, and analytical data for which are collated in Table 2.

Example 9 (E9)

A mixture of 348.0 g of the polypropylene glycol with average molar mass Mn 400 g/mol (PEG 400, melting point: −41° C.) and 116.0 g of a polyethylene glycol with average molar mass Mn of 20,000 g/mol (PEG 20000, melting point: 57° C./) were used as initial charge in a laboratory mixer from PC Laborsystem GmbH with paddle dissolver (dissolver disc diameter 60 mm), and 25.0 g of HDK® H18 hydrophobic fumed silica (obtainable from Wacker Chemie AG; for analytical data see Table 1) were added in portions, with stirring, over a period of about 1 h at a temperature of 70° C. The mixture was then dispersed at 70° C. for 1.0 h in vacuo at 800 rpm. This gave a clear gel, which solidifies at temperatures below 60° C. to give a white composition, and analytical data for which are collated in Table 2.

Example 10 (E10; not According to the Invention)

A mixture of 118.5 g of a polyethylene glycol with average molar mass Mn 600 g/mol (PEG 600, melting point: 17° C.) and 356.2 g of a polyethylene glycol with average molar mass Mn 8000 g/mol (PEG 8000, melting point: 55° C.) were used as initial charge in a laboratory mixer from PC Laborsystem GmbH with paddle dissolver (dissolver disc diameter 60 mm), and 25.0 g of HDK® H18 hydrophobic fumed silica (obtainable from Wacker Chemie AG; for analytical data see Table 1) were added in portions, with stirring, over a period of about 1 h at a temperature of 70° C. The mixture was then dispersed under vacuum at 70° C. for 1.0 h at 800 rpm. A clear gel which solidifies to a white composition at temperatures below 60° C. was obtained, analytical data for which are collated in Table 2.

Example 11 (E10; not According to the Invention)

475.0 g of a polyethylene glycol with average molar mass Mn 8000 g/mol (PEG 8000, melting point: 55° C.) were used as initial charge in a laboratory mixer from PC Laborsystem GmbH with paddle dissolver (dissolver disc diameter 60 mm), and 25.0 g of HDK® H18 hydrophobic fumed silica (obtainable from Wacker Chemie AG; for analytical data see Table 1) were added in portions, with stirring, over a period of about 1 h at a temperature of 70° C. The mixture was then dispersed under vacuum at 70° C. for 1.0 h at 800 rpm. A clear gel which solidifies to a white composition at temperatures below 60° C. was obtained, analytical data for which are collated in Table 2.

TABLE 1

|  | HDK ® H18 |
| --- | --- |
| Methanol number | 74 |
| % Carbon | 4.8 |
| DBP number (g/100 g) | 165 |
| Residual SiOH (nm$^{-1}$) | 0.36 |

Figure 2:
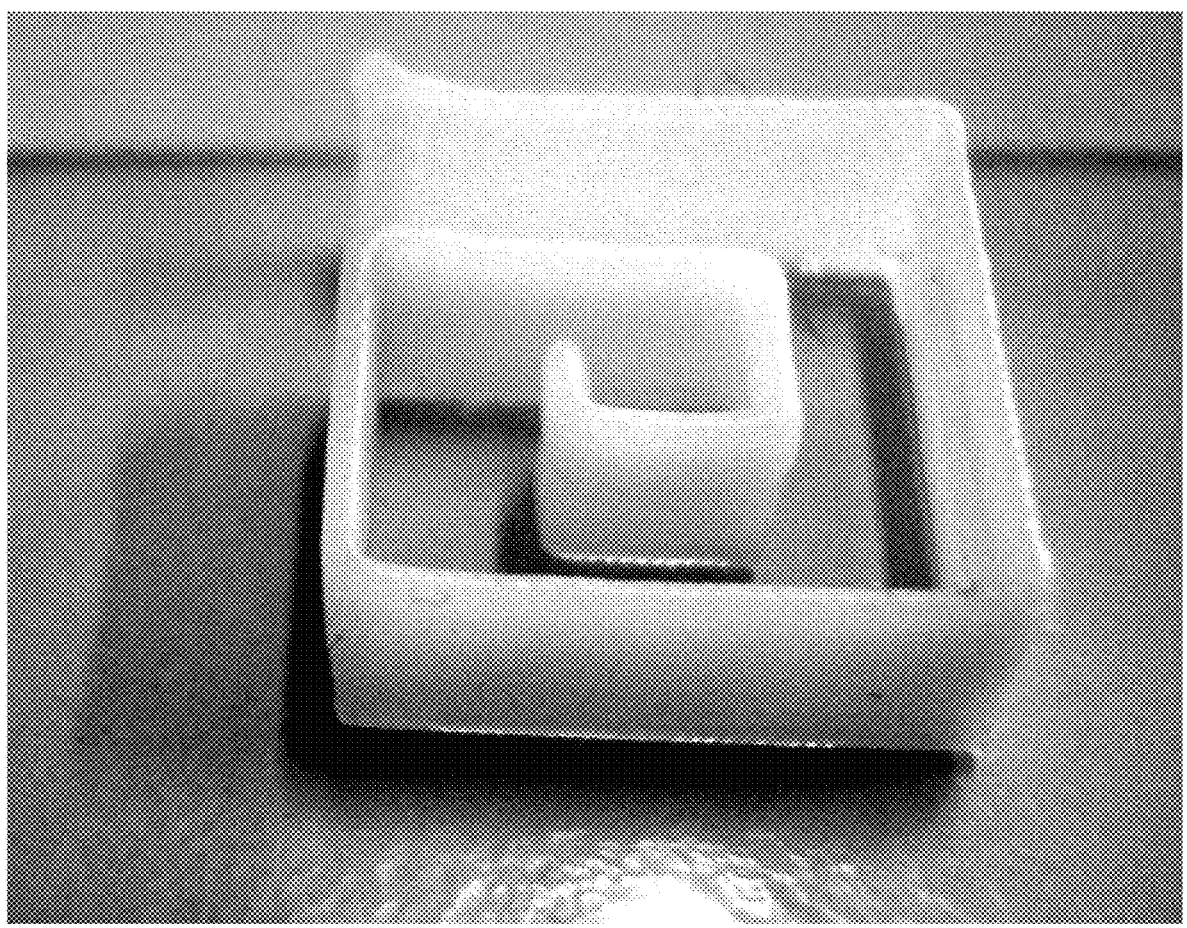
FIG. 2 illustrates on embodiment of a 3D support structure prepared according to the invention.

Jetting Example J1: Using the jetting nozzle parameters given in Table 3, E1 was deposited in droplet form on a glass sample slide of area 25×75 mm to give a rectangular spiral with wall thickness 700 μm and edge length 15 mm and height 10 mm. The rheological properties of the sm melt can give excellent dimensional stability and representational accuracy of the deposited shape. A stable moulding with no displacement of the glass plate caused by shrinkage was obtained (cf. FIG. 2).

Jetting Example J2: Using the jetting nozzle parameters given in Table 3, E2 was deposited. A stable moulding with no displacement of the glass plate caused by shrinkage was obtained in a manner similar to J1.

Jetting-Example J3: Using the jetting nozzle parameters given in Table 3, E3 was deposited. A stable moulding with no displacement of the glass plate caused by shrinkage was obtained in a manner similar to J1.

Jetting-Example J4: Using the jetting nozzle parameters given in Table 3, E4 was deposited. A stable moulding with no displacement of the glass plate caused by shrinkage was obtained in a manner similar to J1.

Jetting-Example J5: Using the jetting nozzle parameters given in Table 3, E5 was deposited. A stable moulding with no displacement of the glass plate caused by shrinkage was obtained in a manner similar to J1.

Jetting-Example J6: Using the jetting nozzle parameters given in Table 3, E6 was deposited. A stable moulding with no displacement of the glass plate caused by shrinkage was obtained in a manner similar to J1.

Jetting-Example J7: Using the jetting nozzle parameters given in Table 3, E7 was deposited. A stable moulding with no displacement of the glass plate caused by shrinkage was obtained in a manner similar to J1.

Jetting-Example J8: Using the jetting nozzle parameters given in Table 3, E8 was deposited. A stable moulding with no displacement of the glass plate caused by shrinkage was obtained in a manner similar to J1.

Jetting-Example J9: Using the jetting nozzle parameters given in Table 3, E9 was deposited. A stable moulding with no displacement of the glass plate caused by shrinkage was obtained in a manner similar to J1.

Figure 3:
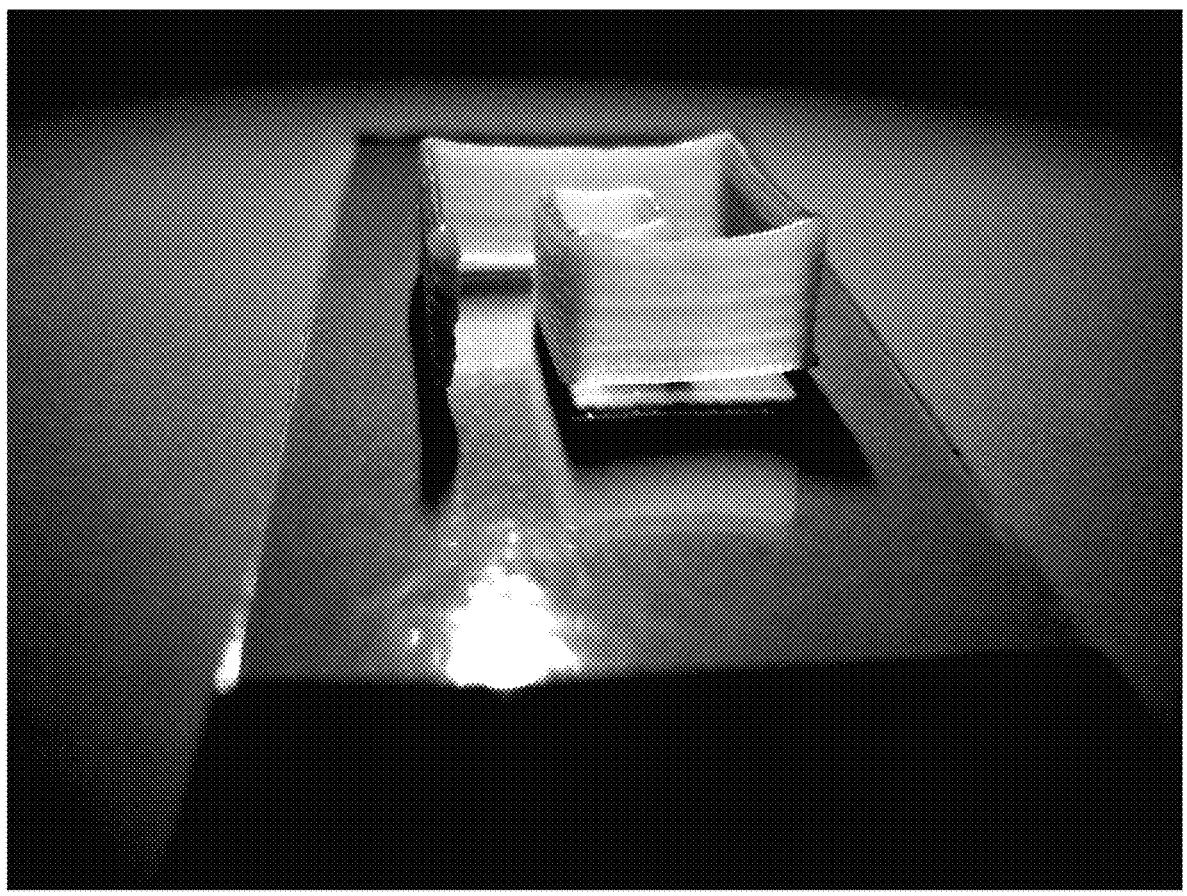
FIG. 3 illustrates a defective support structure not within the scope of the invention.

Jetting Example J10 (not according to the invention): Using the jetting nozzle parameters given in Table 3, E10 was deposited. A stable moulding with displacement of the glass plate caused by shrinkage was obtained (cf. FIG. 3).

Jetting-Example J11 (not according to the invention): Using the jetting nozzle parameters given in Table 3, E11

TABLE 2

|  | Example 1 (E1) | Example 2 (E2) | Example 3 (E3) | Example 4 (E4) | Example 5 (E5) | Example 6 (E6) | Example 7 (E7) | Example 8 (E8) | Example 9 (E9) | Example 10 (E10) | Example 11 (E11) |
| --- | --- | --- | --- | --- | --- | --- | --- | --- | --- | --- | --- |
| Proportion of pRA (%) | 5 | 5 | 5 | 5 | 5 | 4 | 6 | 5 | 5 | 5 | 5 |
| Viscosity 1 s$^{-1}$ (Pas) | 78.2 | 61.8 | 65.1 | 110.3 | 71.1 | 48.2 | 164.3 | 130.2 | 38.1 | 127 | 152.3 |
| Viscosity 100 s$^{-1}$ (Pa · s) | 2 | 1.2 | 1.9 | 5.8 | 1.3 | 1.6 | 3.4 | 2.8 | 1.1 | 3.5 | 4.4 |
| $T_s$ (° C.) | 37.0 | 26.0 | 41.3 | 46.5 | 31.4 | 41.4 | 40.0 | 41.1 | 43.9 | 42.8 | 48.0 |
| dT | 0.467 | 0.690 | 0.630 | 0.360 | 0.544 | 0.675 | 0.613 | 0.505 | 0.515 | 0.267 | 0.453 |
| G' (Pa) | 811.3 | 814.4 | 645.2 | 925 | 802.7 | 379.1 | 2001.6 | 1295.7 | 590.2 | 1177.9 | 855.1 |
| tan d | 0.117 | 0.101 | 0.128 | 0.25 | 0.092 | 0.173 | 0.094 | 0.07 | 0.145 | 0.13 | 0.221 |
| $\tau_{crit}$ (Πα) | 69.6 | 48.5 | 58.9 | 131.1 | 57.2 | 63.2 | 164 | 127 | 71.6 | 110.1 | 169.6 | was deposited. A stable moulding with displacement of the glass plate caused by shrinkage was obtained in a manner similar to J9.

Figure 4:
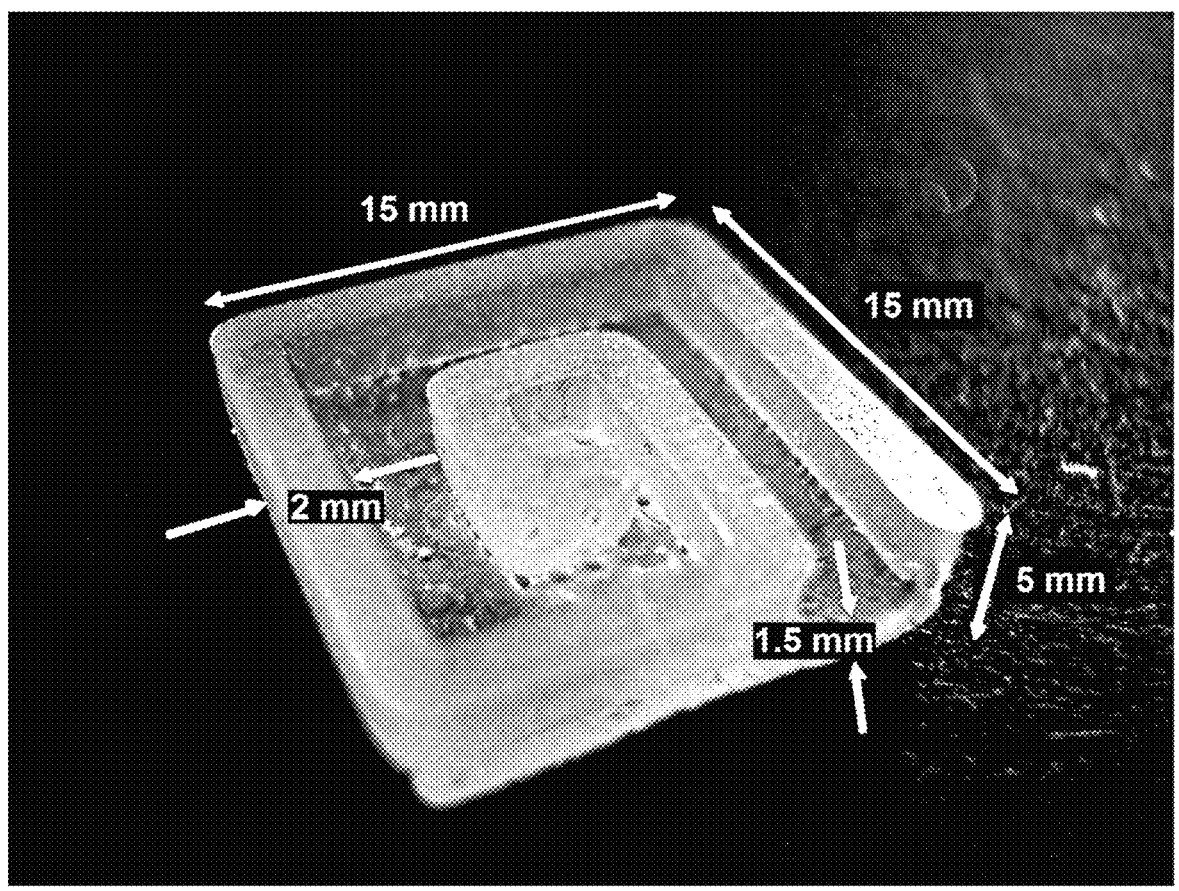
FIG. 4 illustrates a 3D article deposited on an inventive support structure followed by removal of the support structure.

Jetting Example J12: Using the jetting nozzle parameters given in Table 4, SEMICOSIL® 810 UV 1K, a UV-light-induced-addition-crosslinking, translucent silicon rubber composition with viscosity about 310,000 mPa·s (at 0.5 s$^{-1}$) and Shore A vulcanizate hardness 40 (obtainable from WACKER CHEMIE AG) was deposited in droplet form on a glass sample slide of area 25×75 mm to give a rectangular spiral with wall thickness 2 mm and edge length 15 mm and height 3.5 mm. The spiral was crosslinked in the off-line UV chamber described above in accordance with the crosslinking parameters mentioned in that section. After cleaning of the nozzle head and, respectively, the supply lines and replacement of the cartridge, supportive material E3 was then jetted into the cavity of the spiral (see Table 4 for jetting nozzle parameters). After further cleaning of the nozzle head and, respectively, the supply lines and replacement of the S-M cartridge by a SEMICOSIL® 810 UV 1K cartridge, a cover of thickness 1.5 mm was printed onto the spiral, crosslinking was carried out as described above and water was used for washing to remove the supportive material. FIG. 4 shows the moulding obtained.

TABLE 3

| | Example J1 | Example J2 | Example J3 | Example J4 | Example J5 | Example J6 | Example J7 | Example J8 | Example J9 | Example J10 | Example J11 |
|---|---|---|---|---|---|---|---|---|---|---|---|
| Nozzle diameter (μm) | 200 | 200 | 200 | 200 | 200 | 200 | 200 | 200 | 200 | 200 | 200 |
| Rising (ms): | 0.4 | 0.4 | 0.4 | 0.4 | 0.4 | 0.4 | 0.4 | 0.4 | 0.5 | 0.4 | 0.4 |
| Falling (ms): | 0.4 | 0.5 | 0.4 | 0.3 | 0.4 | 0.4 | 0.4 | 0.4 | 0.5 | 0.4 | 0.4 |
| Open Time (ms): | 0.5 | 0.5 | 0.5 | 0.5 | 0.5 | 0.5 | 0.5 | 0.5 | 0.4 | 0.5 | 0.5 |
| Needle Lift (%): | 70 | 70 | 70 | 100 | 60 | 100 | 100 | 70 | 60 | 100 | 100 |
| Delay (ms) | 38 | 38 | 38 | 38 | 38 | 38 | 38 | 38 | 38 | 38 | 38 |
| Cartridge heating (° C.) | 60 | 52 | 55 | 70 | 50 | 55 | 55 | 55 | 62 | 55 | 70 |
| Nozzle heating (° C.): | 60 | 52 | 55 | 70 | 50 | 55 | 55 | 55 | 62 | 55 | 70 |
| Cartridge admission pressure (bar) | 4 | 4 | 4 | 4 | 4 | 4 | 4 | 4 | 4 | 4 | 4 |
| Voxel diameter (μm) | 610 | 716 | 659 | 537 | 628 | 750 | 655 | 674 | 651 | 574 | 759 |
| Shrinkage | no | no | no | no | no | no | no | no | no | yes | yes |

TABLE 4

| | Example J12 | |
|---|---|---|
| | Silicone composition | Supportive material E3 |
| Nozzle diameter (μm) | 200 | 200 |
| Rising (ms): | 0.3 | 0.4 |
| Falling (ms): | 0.1 | 0.4 |
| Open Time (ms): | 15 | 0.5 |
| Needle Lift (%): | 100 | 90 |
| Delay (ms) | 25 | 38 |
| Nozzle heating (° C.): | 40 | 55 |
| Cartridge heating (° C.) | — | 55 |
| Cartridge admission pressure (bar) | 3.0 | 4 |
| Voxel diameter (μm) | 700 | 700 |

The invention claimed is:

1. A process for the additive manufacturing of mouldings by site-specific delivery of a structure-forming material ("sfm") comprising:

delivering simultaneously or at staggered intervals at least one supportive material ("sm") into regions which are to remain free from sfm, where the delivery of the sm is achieved by a device which has at least one delivery unit for the sm positionable in x-, y- and z-directions with a precision of at least ±100 μm which delivers sm in a site-specific manner in an x, y-operating plane and also in the z-direction, successively constructs a supportive structure made of sm for the mouldings, with the proviso that the sm, at 70° C. is a pseudoplastic, viscoelastic composition comprising (A) a polyether composition comprising (A1) at least one first polyether having a melting point lower than 35° C. and (A2) at least one second polyether having a melting point of 35° C. or higher, wherein the second polyether (A2) is present in an amount of 5% by weight or more to 70% by weight or less based on the total weight of the polyether composition (A), (B) at least one particulate rheological additive, and (C) optionally other additional substances, the polyether composition (A) having a shear viscosity of at most 10 Pas measured at 70° C. with shear rate 100 s$^{-1}$ using a rheometer with plate-on-plate geometry with a diameter of 25 mm at a gap width of 300 μm, has a storage modulus G' of at least 100 Pa, measured at 70° C., and a solidification temperature of from 20° C. or more up to 60° C. or less, and once the manufacturing of the moulding has been concluded, removing the sm from the moulding, wherein the melting points are determined by DSC according to DIN EN ISO 11357-3, and the solidification temperature is obtained from a temperature sweep measurement of a sample under dynamic shear stress on a rheometer with plate-on-plate geometry, diameter 25 mm and gap width of 300 μm, wherein the sample is cooled in a stepwise manner from 70° C. to 20° C. at a cooling rate of 1.5 K/min and the sample is stressed with a constant deformation of 0.1% at a constant frequency of 10 Hz.

2. The process of claim 1, wherein the first polyether (A1) and the second polyether (A2) are independently of one another selected from the group consisting of polyethylene glycol, polypropylene glycol, polyethylene glycol-polypropylene glycol copolymers, and monoethers thereof.

3. The process of claim 1, wherein the first polyether (A1) is selected from the group consisting of
polyethylene glycols and/or monoethers thereof having a number-average molar mass Mn of less than 1000 g/mol,
polypropylene glycols and/or monoethers thereof having a number-average molar mass Mn of less than 2000 g/mol and
polyethylene glycol-polypropylene glycol copolymers and/or monoethers thereof having a number-average molar mass Mn of less than 2000 g/mol, wherein the number-average molar mass Mn is determined by size exclusion chromatography.

4. The process of claim 1, wherein the second polyether (A2) is selected from the group consisting of
polyethylene glycols and/or monoethers thereof having a number-average molar mass Mn of 1000 g/mol or more and
polyethylene glycol-polypropylene glycol copolymers or monoethers thereof having a number-average molar mass Mn of 2000 g/mol or more,
wherein the number-average molar mass Mn is determined by size exclusion chromatography.

5. The process of claim 3, wherein the second polyether (A2) is selected from the group consisting of
polyethylene glycols and/or monoethers thereof having a number-average molar mass Mn of 1000 g/mol or more and
polyethylene glycol-polypropylene glycol copolymers or monoethers thereof having a number-average molar mass Mn of 2000 g/mol or more,
wherein the number-average molar mass Mn is determined by size exclusion chromatography.

6. The process of claim 1, wherein the first polyether (A1) is a polyethylene glycol having a number-average molar mass Mn of less than 1000 g/mol, wherein the number-average molar mass Mn is determined by size exclusion chromatography.

7. The process of claim 1, wherein the second polyether (A2) is a polyethylene glycol having a number-average molar mass Mn of 1000 g/mol or more, wherein the number-average molar mass Mn is determined by size exclusion chromatography.

8. The process of claim 6, wherein the second polyether (A2) is a polyethylene glycol having a number-average molar mass Mn of 1000 g/mol or more, wherein the number-average molar mass Mn is determined by size exclusion chromatography.

9. The process of claim 1, wherein the first polyether (A1) is a polyethylene glycol having a number-average molar mass Mn of less than 800 g/mol, wherein the number-average molar mass Mn is determined by size exclusion chromatography.

10. The process of claim 1, wherein the second polyether (A2) is a polyethylene glycol having a number-average molar mass Mn of 2000 g/mol or more, wherein the number-average molar mass Mn is determined by size exclusion chromatography.

11. The process of claim 9, wherein the second polyether (A2) is a polyethylene glycol having a number-average molar mass Mn of 2000 g/mol or more, wherein the number-average molar mass Mn is determined by size exclusion chromatography.

12. The process of claim 1, wherein the proportion of the second polyether (A2) based on the total weight of the polyether composition (A) is 10% by weight or more to 65% by weight or less.

13. The process of claim 1, wherein the proportion of the second polyether (A2) based on the total weight of the polyether composition (A) is 15% by weight or more to 60% by weight or less.

14. The process of claim 1, wherein component (B) comprises at least one hydrophobic silica having a silanol group density of less than 1.8 silanol groups per $nm^2$ determined by acid-base titration.

15. The process of claim 1, wherein component (B) comprises at least one hydrophobic silica having a methanol number of at least 30, wherein the methanol number is the percentage proportion of methanol which must be added to a water phase to achieve complete wetting of the silica, wherein complete wetting means a complete sinking of the silica in the water-methanol test liquid.

16. The process of claim 1, wherein the sm of the moulding is removed mechanically or by dissolution in a solvent.

* * * * *